Patented Dec. 4, 1945

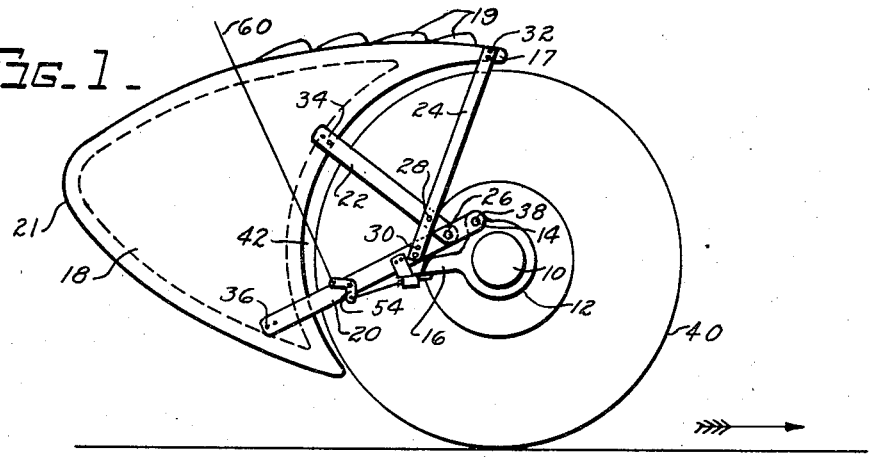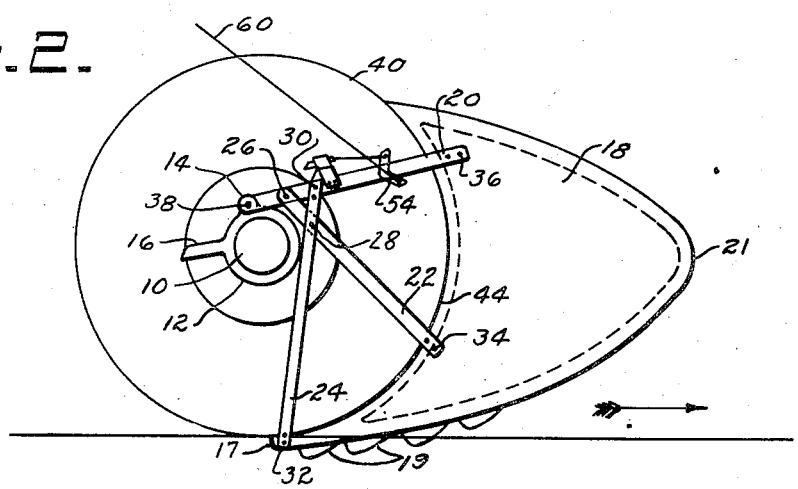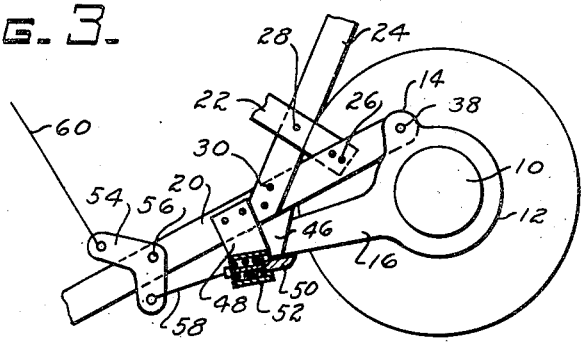

2,390,127

UNITED STATES PATENT OFFICE 2,390,127

COMBINED FAIRING AND CHOCK FOR AIRCRAFT

Edward H. Schneckloth, Davenport, Iowa

Application August 30, 1944, Serial No. 551,943

4 Claims. (Cl. 244—110)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in fixed landing gear of the kind used on liaison and other light aircraft, and more particularly to an arrangement of the fairing currently employed to streamline the landing wheels in flight, whereby the fairing will serve also as a chock for holding the craft when it is parked or when it is being started.

An object of the invention is to so construct the fairing and so attach it to the landing gear that it may conveniently be swung in a hinge means into a position where it will serve as a chock when the craft is grounded.

Another object of the invention is to so arrange the operable parts of the device that the pilot of the craft may selectively set the mechanism from his seat in the cockpit to function in one or the other capacity.

Other objects and advantages will appear upon reference to the following specification, considered in conjunction with the drawing, wherein:

Fig. 1 is a side elevation showing the device as it is set during flight and in landing, i. e., with the fairing occupying the position required to streamline the wheel.

Fig. 2 is a side elevation showing the device when it is conditioned to act as a chock, as for instance when the craft is grounded.

Fig. 3 is an enlarged view of the latch mechanism provided for holding the device in the flight position.

Like reference characters refer to like parts throughout the several views.

Firmly attached to the wheel strut 10 is a bracket member 12 which has an upwardly extending hinge ear 14 and a rearwardly extending latch engaging arm 16.

The fairing 18 may be made of any suitable material and may be hollow, as shown and provided on its outer surface near the end 17 with a series of transverse cleats 19 to assist it in its function as a chock. The fairing is carried on a framework made up of strips 20, 22, and 24, riveted together as at 26, 28, and 30, the strips at their outer ends being riveted to the fairing as at 32, 34, and 36.

The inner end of the strip 20 is hinged by a hinge pin 38 to the ear 14, whereby the fairing may be swung on the hinge from the flight and landing position shown in Fig. 1 to the ground position shown in Fig. 2.

It should be noted that the hinge pin 38 is eccentrically positioned with respect to the axis of the wheel 40. The result of this arrangement is that there is a considerable gap 42 between the fairing and the wheel when the fairing is in the position shown in Fig. 1. This gap gives ample clearance for free rotation of the wheel when the craft is landing. On the other hand when in the position Fig. 2, where the fairing is acting as a chock, the fairing is tight up to the wheel as at 44 whereby the weight of the craft is on the solid narrow end of the fairing and not on the strips 20, 22, and 24.

For holding the fairing in the flight and landing position, a latch mechanism is provided. This latch mechanism comprises a stop member 46 (see Fig. 3) which rests on the outer beveled end of the arm 16 and a latch 48 having a bolt 50, the bolt being provided with a spring 52 which causes it to engage the underside of the arm 16 near the outer end, thereby locking the device in the position shown in Fig. 1.

A bell crank 54 is pivoted at 56 on the strip 20, one end of the bell crank being connected by a short rod 58 to the bolt 50, the other end of the bell crank being provided with a control rod 60 which extends to a place in the cockpit convenient for actuation by the pilot.

During flight and in landing the locked position shown in Fig. 1 will be maintained. After the craft has been landed and a chock is desired for parking or for starting, the pilot may preferably first give a light pull in the control rod 60 to withdraw the bolt 50, then by a harder pull on the rod throw the fairing up and over top center, after which it will drop by gravity to the position shown in Fig. 2, the wheel 40 being allowed to roll forward and over the narrow end 17 of the fairing. The device will now be functioning as a chock.

Thereafter when the device has served its purpose as a chock, as seen in Fig. 2, the pilot may give a sharp pull on the control rod 60 so as to raise the end 21 and tilt the wheel backwardly off the end 17, after which a relatively light pull on the control rod will throw the fairing backward over center into the flight and landing position shown in Fig. 1.

Having described my invention, I claim:

1. In an aircraft fixed landing gear of the type having a wheel, the improvement which comprises a member for streamlining said wheel, means hingedly connecting said member to said landing gear, and means for swinging said member on said hinge axis to a position in back of said wheel to serve as a fairing and to a position in front of said wheel to serve as a chock, the hinge axis being so located with respect to the wheel axis that when the member is in the fairing position it is slightly spaced apart from said wheel and in the chock position is against the wheel.

2. An improvement in an aircraft fixed landing gear of the class having a wheel, said improvement comprising a combined fairing and chock which includes a streamlined member, means pivotally connecting said member to said landing gear eccentrically of said wheel axis, said pivot being so placed that the member may be swung to a fairing position in the rear of the wheel above the wheel axis and slightly spaced from the wheel and to a chock position in front of the wheel, below the wheel axis and against the wheel.

3. The device of claim 2 with the addition of latch means for holding the member in the fairing position.

4. The device of claim 2 with the addition of latch means for holding the member in the fairing position and means operative by a single movement to first undo the latch means then shift the member from the fairing to the chock position.

EDWARD H. SCHNECKLOTH.